(12) United States Patent
Day et al.

(10) Patent No.: US 9,383,881 B2
(45) Date of Patent: Jul. 5, 2016

(54) INPUT DEVICE AND METHOD WITH PRESSURE-SENSITIVE LAYER

(75) Inventors: Shawn P. Day, San Jose, CA (US); Richard R. Schediwy, Union City, CA (US)

(73) Assignee: Synaptics Incorporated, San Jose, CA (US)

( * ) Notice: Subject to any disclaimer, the term of this patent is extended or adjusted under 35 U.S.C. 154(b) by 797 days.

(21) Appl. No.: 12/792,578

(22) Filed: Jun. 2, 2010

(65) Prior Publication Data

US 2010/0308844 A1  Dec. 9, 2010

Related U.S. Application Data

(60) Provisional application No. 61/183,809, filed on Jun. 3, 2009.

(51) Int. Cl.
*G01R 27/26* (2006.01)
*G06F 3/045* (2006.01)
*G06F 3/041* (2006.01)

(52) U.S. Cl.
CPC .............. *G06F 3/045* (2013.01); *G06F 3/0414* (2013.01); *G06F 3/0416* (2013.01)

(58) Field of Classification Search
CPC ....................................................... G01R 27/26
USPC ................. 324/642–643, 642–543, 650–690; 345/173–178; 204/193, 194, 400, 421, 204/424, 427; 73/488, 504
See application file for complete search history.

(56) References Cited

U.S. PATENT DOCUMENTS

| 4,758,830 | A |   | 7/1988 | Levien et al. |
| 5,510,813 | A |   | 4/1996 | Makinwa et al. |
| 5,543,590 | A | * | 8/1996 | Gillespie et al. ........... 178/18.06 |

(Continued)

FOREIGN PATENT DOCUMENTS

| CN | 1311470 A | 9/2001 |
| CN | 1826576 A | 8/2006 |

(Continued)

OTHER PUBLICATIONS

International Search Report PCT/US2010/029963 dated Nov. 17, 2010.

(Continued)

*Primary Examiner* — Arleen M Vazquez
*Assistant Examiner* — Brent J Andrews
(74) *Attorney, Agent, or Firm* — Osha Liang LLP

(57) ABSTRACT

Devices and methods are provided that facilitate improved input device performance. Specifically, the devices and methods facilitate input using a pressure-sensitive layer whose electrical admittivity changes in response to pressure applied to a touch surface. An input device is provided that comprises a plurality of sensor electrodes including a set of primary sensor electrodes and a set of secondary sensor electrodes. Each primary sensor electrode is electrically coupled to at least one secondary sensor electrode to form a set of electrical admittances. In one embodiment, the pressure-sensitive layer is located between the sensor electrodes and the touch surface, such that changes in the admittivity of the pressure-sensitive layer in response to pressure on the touch surface cause corresponding changes in the admittances between the primary and secondary sensor electrodes.

37 Claims, 17 Drawing Sheets

(56) References Cited

U.S. PATENT DOCUMENTS

| | | | |
|---|---|---|---|
| 5,812,357 A * | 9/1998 | Johansen et al. | 361/212 |
| 5,854,625 A | 12/1998 | Frisch | |
| 5,942,733 A | 8/1999 | Allen et al. | |
| 5,945,594 A * | 8/1999 | Kendig et al. | 73/86 |
| 5,945,980 A | 8/1999 | Moissev et al. | |
| 6,002,389 A * | 12/1999 | Kasser | 345/173 |
| 6,215,476 B1 | 4/2001 | Depew et al. | |
| 6,239,790 B1 | 5/2001 | Martinelli et al. | |
| 6,452,514 B1 | 9/2002 | Philipp | |
| 6,555,235 B1 | 4/2003 | Aufderheide et al. | |
| 6,642,857 B1 | 11/2003 | Schediwy et al. | |
| 6,819,316 B2 | 11/2004 | Schulz et al. | |
| 6,888,537 B2 | 5/2005 | Benson et al. | |
| 7,148,882 B2 | 12/2006 | Kamrath et al. | |
| 7,154,481 B2 | 12/2006 | Cross et al. | |
| 7,260,999 B2 | 8/2007 | Divigalpithiya et al. | |
| 7,463,246 B2 | 12/2008 | Mackey | |
| 8,058,884 B2 | 11/2011 | Betancourt | |
| 8,199,127 B2 | 6/2012 | Mamba et al. | |
| 2002/0154039 A1 * | 10/2002 | Lambert et al. | 341/33 |
| 2005/0052425 A1 | 3/2005 | Zadesky et al. | |
| 2006/0017450 A1 * | 1/2006 | Thibedeau et al. | 324/705 |
| 2006/0097991 A1 * | 5/2006 | Hotelling et al. | 345/173 |
| 2006/0170659 A1 | 8/2006 | Yamamoto et al. | |
| 2006/0209039 A1 * | 9/2006 | Destura et al. | 345/173 |
| 2007/0198926 A1 | 8/2007 | Joguet et al. | |
| 2008/0006453 A1 * | 1/2008 | Hotelling | 178/18.06 |
| 2008/0007539 A1 | 1/2008 | Hotelling | |
| 2008/0062142 A1 * | 3/2008 | Furukawa | 345/173 |
| 2008/0165139 A1 | 7/2008 | Hotelling et al. | |
| 2008/0245582 A1 | 10/2008 | Bytheway | |
| 2008/0309634 A1 | 12/2008 | Hotelling | |
| 2009/0020343 A1 | 1/2009 | Rothkopf et al. | |
| 2009/0077798 A1 | 3/2009 | Hirai et al. | |
| 2009/0256817 A1 | 10/2009 | Perlin et al. | |
| 2009/0273573 A1 | 11/2009 | Hotelling | |
| 2010/0013785 A1 | 1/2010 | Murai et al. | |
| 2010/0141591 A1 | 6/2010 | Lin | |
| 2010/0265212 A1 | 10/2010 | Sekiguchi et al. | |

FOREIGN PATENT DOCUMENTS

| | | |
|---|---|---|
| JP | 11073135 | 3/1999 |
| JP | 2001075740 A2 | 3/2001 |
| JP | 2005078644 A2 | 3/2005 |
| JP | 2010128647 A | 6/2010 |
| WO | 9718528 | 5/1997 |
| WO | 2008149789 A1 | 12/2008 |

OTHER PUBLICATIONS

International Search Report PCT/US2010/037279 dated Dec. 27, 2010.
United States Patent and Trademark Office, Office Action for U.S. Appl. No. 12/749,946, dated Jun. 6, 2012.
United States Patent and Trademark Office, Final Office Action for U.S. Appl. No. 12/749,946, dated Dec. 6, 2012.
Japan Patent Office, Notice of Reasons for Rejection for Japanese Patent Application No. P2012-514135, mailed Mar. 4, 2014.
State Intellectual Property Office of the People'S Republic of China, Office Action for Chinese Patent Application No. 201080024918.X, mailed Feb. 8, 2014.
State Intellectual Property Office of the Peoples' Republic of China, Office Action for Chinese Patent Application No. 201080024918.X, mailed Aug. 18, 2014.
Third Office Action in corresponding Chinese Application No. 201080024918.X dated Jan. 26, 2015 (34 pages).
Fourth Office Action issued in the counterpart Chinese Patent Application No. 201080024918.X, mailed Aug. 24, 2015 (41 pages).

* cited by examiner

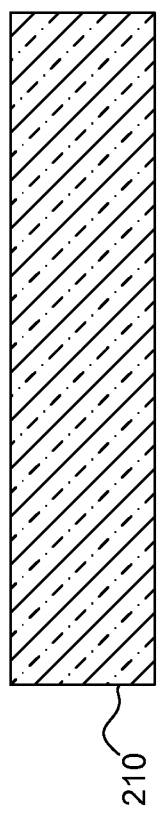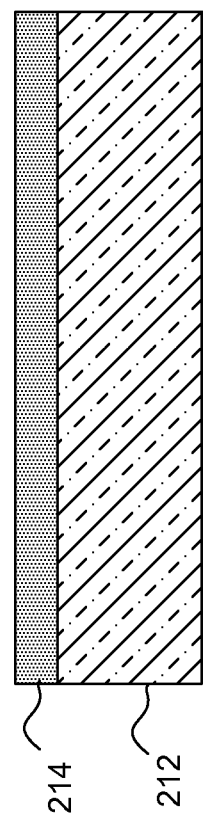

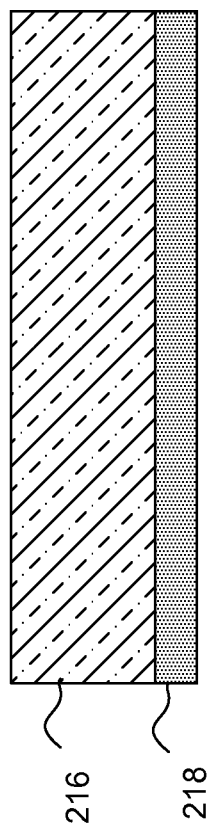
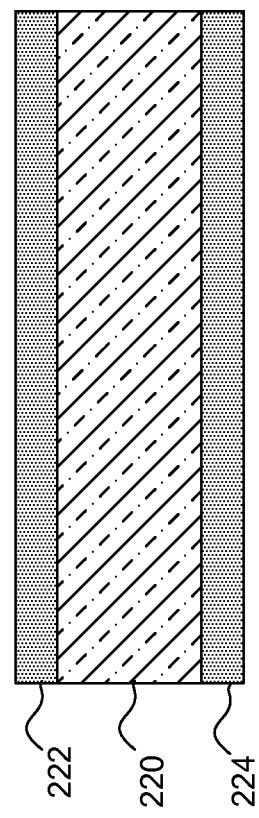

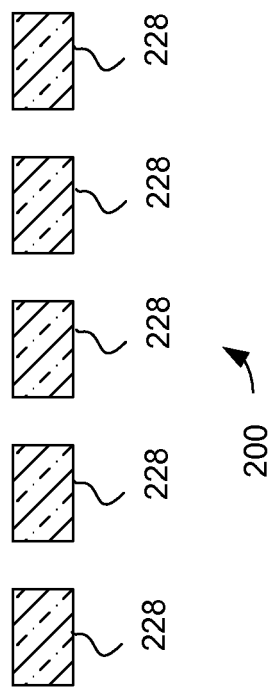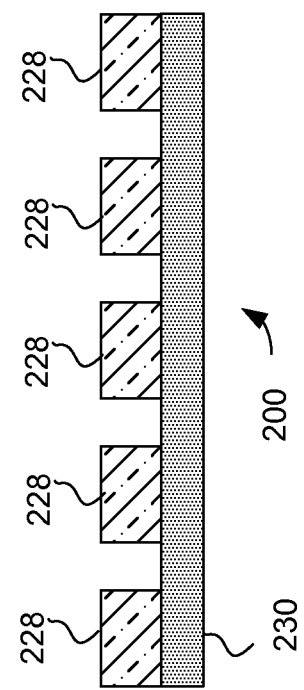

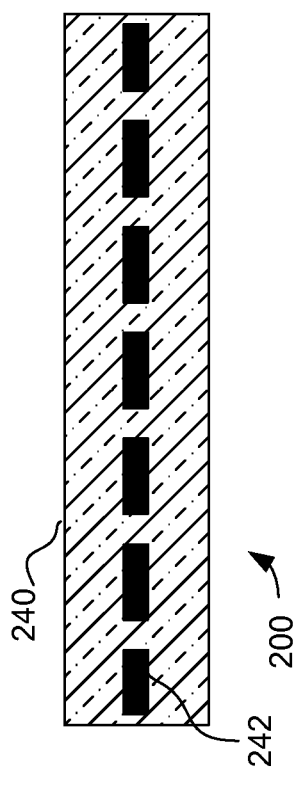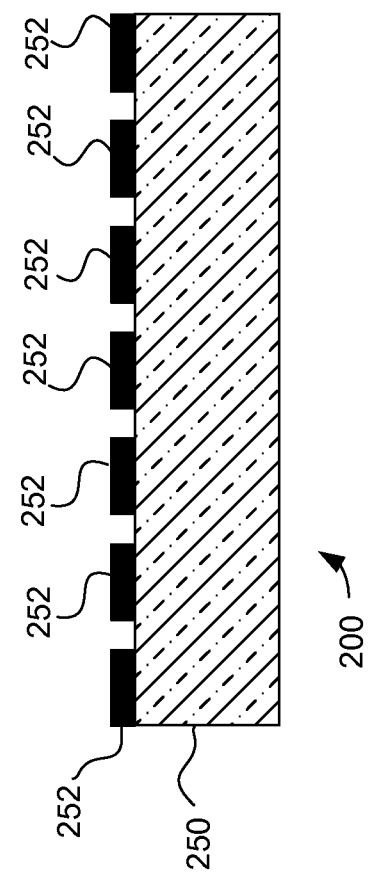

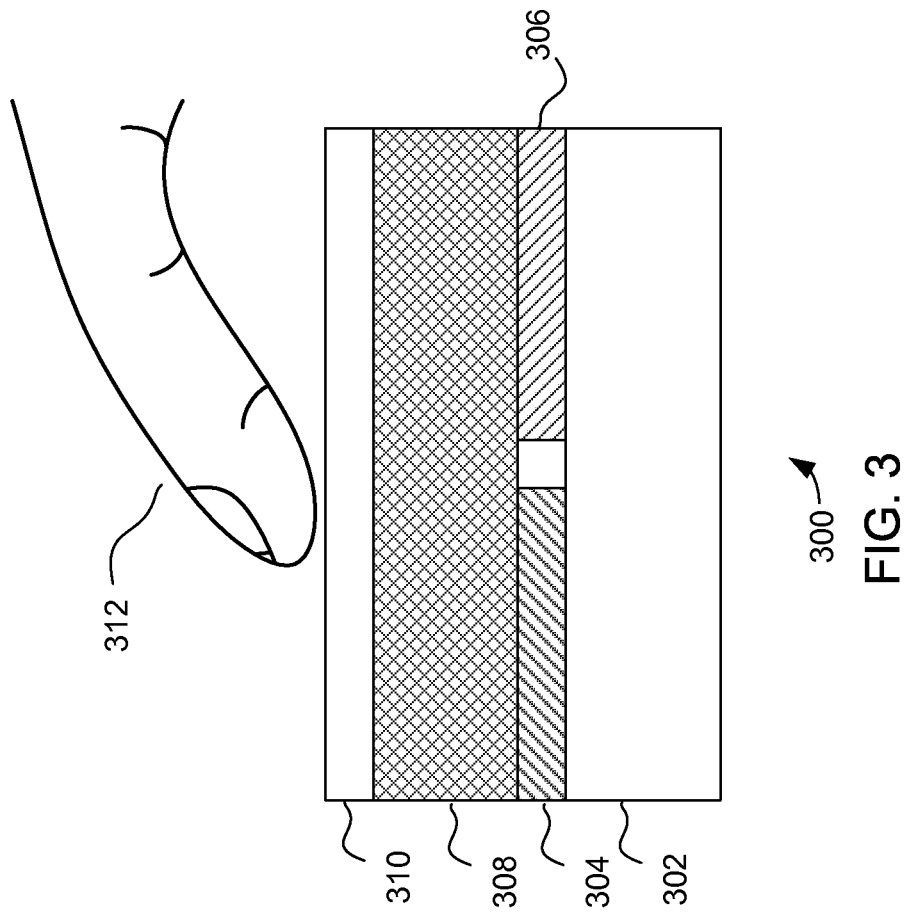

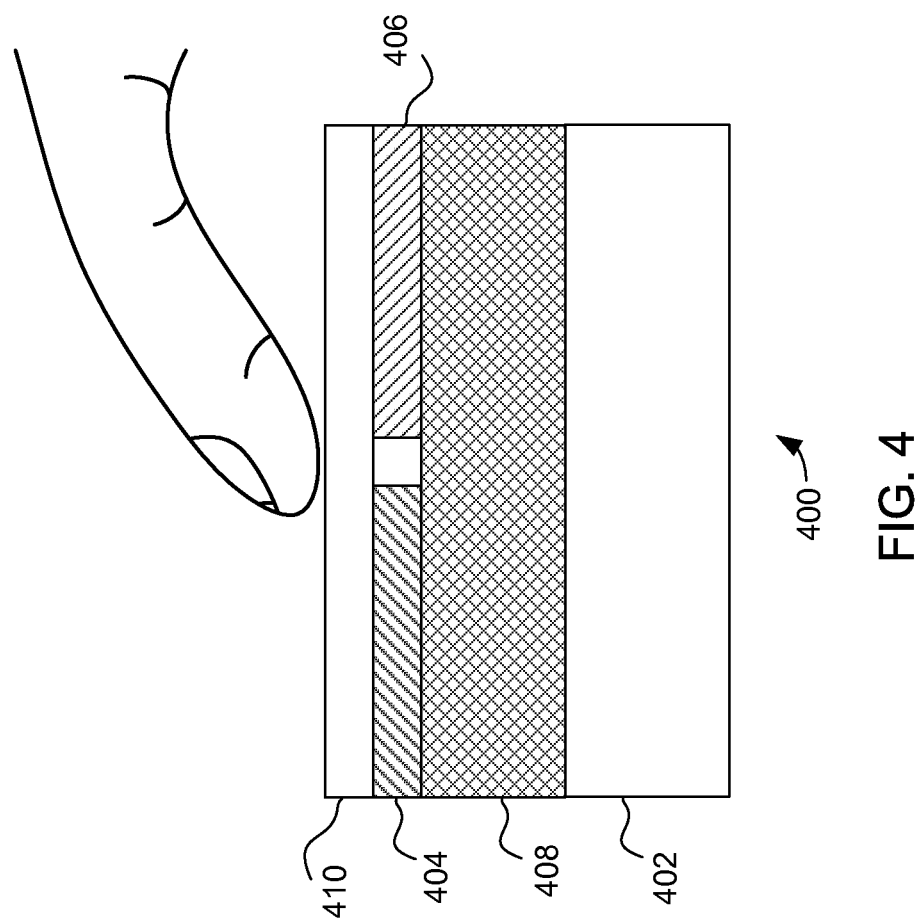

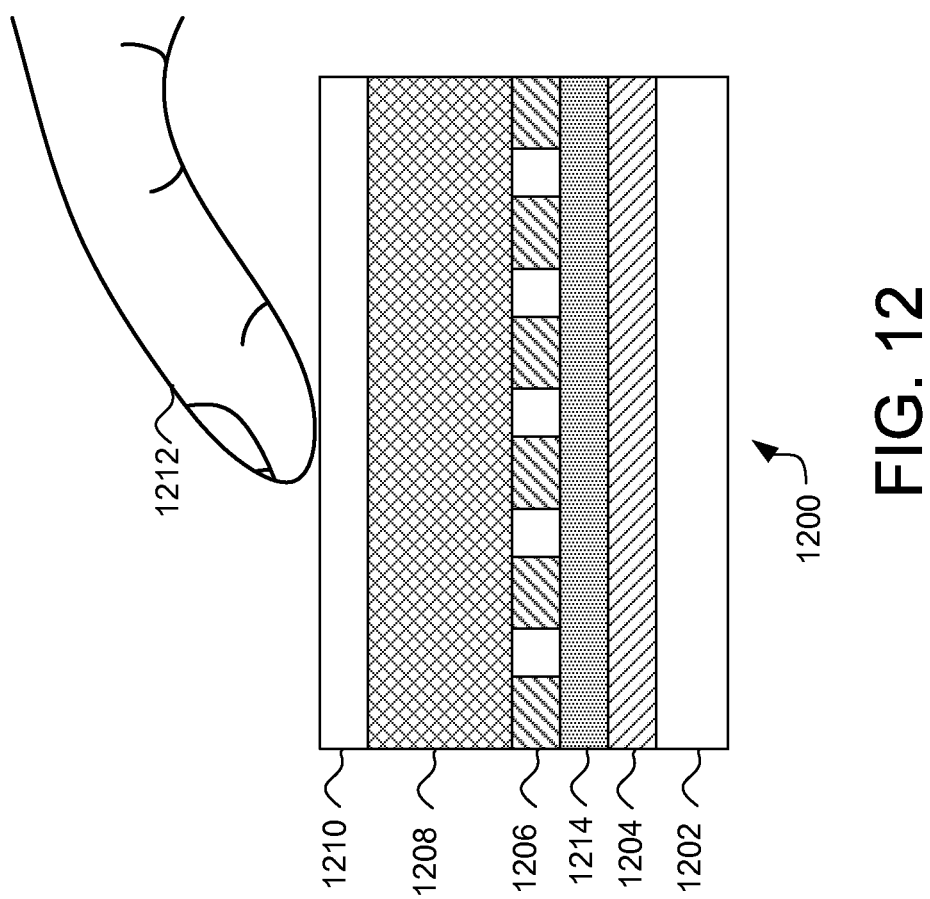

INPUT DEVICE AND METHOD WITH PRESSURE-SENSITIVE LAYER

PRIORITY DATA

This application claims priority of U.S. Provisional Patent Application Ser. No. 61/183,809, which was filed on Jun. 3, 2009, and is incorporated herein by reference.

FIELD OF THE INVENTION

This invention generally relates to electronic devices, and more specifically relates to input devices, such as proximity sensor devices.

BACKGROUND OF THE INVENTION

Proximity sensor devices (also commonly called touchpads or touch sensor devices) are widely used in a variety of electronic systems. A proximity sensor device typically includes a sensing region, often demarked by a surface, which uses capacitive, resistive, inductive, optical, acoustic and/or other technology to determine the presence, location and/or motion of one or more fingers, styli, and/or other objects. The proximity sensor device, together with finger(s) and/or other object(s), may be used to provide an input to the electronic system. For example, proximity sensor devices are used as input devices for larger computing systems, such as those found integral within notebook computers or peripheral to desktop computers. Proximity sensor devices are also used in smaller systems, including handheld systems such as personal digital assistants (PDAs), remote controls, digital cameras, video cameras, communication systems such as wireless telephones and text messaging systems. Increasingly, proximity sensor devices are used in media systems, such as CD, DVD, MP3, video or other media recorders or players.

Many electronic devices include a user interface (UI) and an input device for interacting with the UI (e.g., interface navigation). A typical UI includes a screen for displaying graphical and/or textual elements. The increasing use of this type of UI has led to a rising demand for proximity sensor devices as pointing devices. In these applications the proximity sensor device may function as a value adjustment device, cursor control device, selection device, scrolling device, graphics/character/handwriting input device, menu navigation device, gaming input device, button input device, keyboard and/or other input device.

There is a continuing need for improvements in input devices. In particular, there is a continuing need for improvements in the performance, functionality and usability of proximity sensors as input devices in UI applications.

BRIEF SUMMARY OF THE INVENTION

Devices and methods are provided that facilitate improved input device performance. Specifically, the device and method facilitate input using a pressure-sensitive layer whose electrical admittivity changes in response to pressure applied to a touch surface. In one embodiment, an input device is provided that comprises a plurality of sensor electrodes including a set of primary sensor electrodes and a set of secondary sensor electrodes. Each primary sensor electrode is electrically coupled to at least one secondary sensor electrode to form a set of electrical admittances. In one embodiment, the pressure-sensitive layer is located between the sensor electrodes and the touch surface, such that changes in the admittivity of the pressure-sensitive layer in response to pressure on the touch surface cause corresponding changes in the admittances between the primary and secondary sensor electrodes.

In one embodiment the set of admittances comprises a set of elastive admittances, or elastances. In this embodiment, the elastivity of the pressure-sensitive layer changes in response to applied pressure.

In a variation on these embodiments, a processing system is coupled to the primary sensor electrodes and the secondary sensor electrodes in order to measure the admittances, and from these measurements determine positional information for input objects in a sensing region. Furthermore, from such measurements the processing system may be configured to determine pressure information for an input object applying pressure to a touch surface. Finally, the processing system may be configured to distinguish between two different types of objects based upon the direction of change (i.e. increase or decrease) of a measure of at least one of the admittances. This embodiment may be used to distinguish between conductive objects and nonconductive objects.

In all of these embodiments the pressure-sensitive layer can be implemented with materials or constructions having a pressure-sensitive electrical admittivity (PSEA). Such PSEA materials or constructions change their admittivity in response to pressure. These embodiments are particularly useful for determining pressure information for input objects applying pressure to the touch surface and for determining the type of input object.

BRIEF DESCRIPTION OF DRAWINGS

The preferred exemplary embodiment of the present invention will hereinafter be described in conjunction with the appended drawings, where like designations denote like elements, and:

FIGS. 2-12 are diagrams of parts of input devices in accordance with embodiments of the invention.

DETAILED DESCRIPTION OF THE INVENTION

Overview

Figure 1:
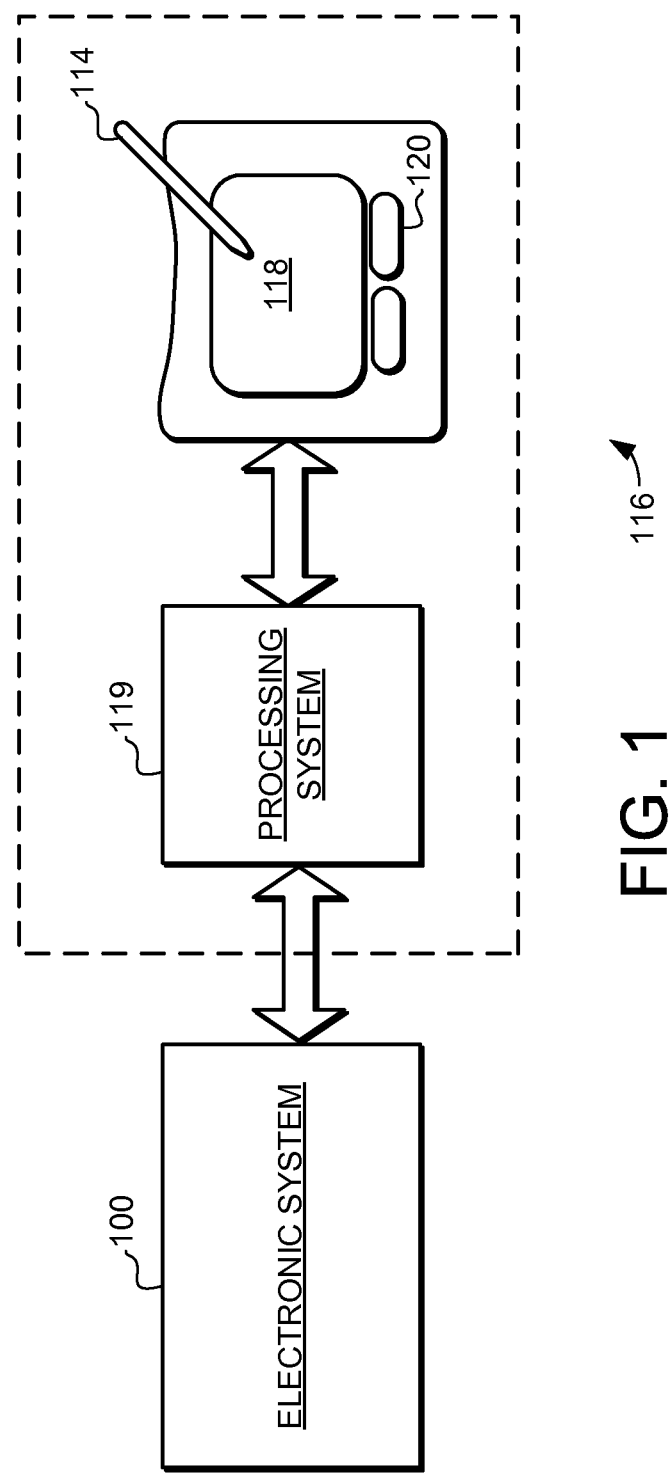
FIG. 1 is a block diagram of an exemplary system including an input device in accordance with an embodiment of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein involve the measurement of an electrical property known as electrical admittance. Admittance is a measure of how easily a current will flow between two electrodes, and is defined by:

$$Y = G + jB \qquad \text{Equation 1}$$

where Y is the admittance, G is an electrical property known as conductance, B is an electrical property known as susceptance, and j denotes the imaginary part of a complex number. If the magnitude of the susceptance, B, is much smaller than the conductance, G, then the admittance is said to be a conductive admittance, or simply a conductance. In those cases when the susceptance, B, is greater than zero, it is known as an elastive susceptance. If the susceptance, B, is greater than zero, and if the magnitude of B is significantly larger than the conductance, G, making G relatively insignificant, then the admittance is said to be an elastive admittance. An elastive admittance is also commonly referred to as an elastance. The mathematical reciprocal of an elastive admittance is known as a capacitive impedance, a capacitance, or a transcapacitance. Note that while capacitance is the reciprocal of elastance, all of these terms refer to a common physical property. The only difference is in the mathematical representation. Thus, throughout this document where the term "elastive admittance" refers to a physical property, the terms "elastance", "capacitive impedance", "capacitance", and "transcapacitance" can generally be used interchangeably.

When a material is located in proximity to two electrodes, it can change the admittance between those electrodes. Typically, materials have a property known as admittivity, which determines the amount of change in the measured admittance. If the material's type or construction is such that its admittivity changes in response to applied pressure, then the admittance measured between the two electrodes will change as a function of the applied pressure. Such a material, whose admittivity changes in response to pressure, is referred to herein as a pressure-sensitive material, or a pressure-sensitive electrical admittivity (PSEA) material. When such a material is disposed in a layer as part of a touch sensing system, it is herein referred to as a pressure-sensitive layer or a PSEA layer.

The admittivity of a material can change as a result of the change in a bulk physical property such as the material's dielectric constant or its electrical conductivity. One example of such a material is an elastic polymer containing embedded conductive particles. Under pressure or compression, the particles move slightly closer together, changing the dielectric constant or the electrical conductivity of the material. In other cases, stresses or strains in the material can have a similar effect. The admittivity of a material can also change as a result of a change in the material's overall geometry, such as when a material deflects or compresses under pressure.

In one embodiment, the admittance between two electrodes (a primary sensor electrode and a secondary sensor electrode) can be measured as follows. A signal is driven onto the primary sensor electrode, causing a second electrical signal to appear on the secondary electrode by virtue of the electrical coupling between the two sensor electrodes. The resulting second electrical signal can be measured by appropriate electrical circuitry, and from this measurement the admittance between the two electrodes can be determined. In this configuration, the primary sensor electrode is sometimes referred to as a "transmitting sensor electrode," "driving sensor electrode," "transmitter," or "driver"—at least for the duration while it is being driven. Other names may also be used, including contractions or combinations of the earlier names (e.g. "driving electrode" or "driver electrode." In this same configuration, the secondary sensor electrode is sometimes referred to as the "receiving sensor electrode," "receiver electrode," or "receiver" —at least for the duration while it is receiving the driven signal due to the electrical coupling with the primary sensor electrode. Similarly, other names may also be used, including contractions or combinations of the earlier names. Some embodiments may contain multiple transmitting sensor electrodes and/or multiple receiving sensor electrodes, which can be used simultaneously or at differing times.

In another embodiment, the admittance between a single sensor electrode and an input object can be measured as follows. An electrical signal is driven onto the sensor electrode and a property of that signal is measured using appropriate electrical circuitry. For example, a voltage signal can be driven onto the sensor electrode, and the resulting current flowing onto that sensor electrode can be measured. As an input object approaches the sensor electrode, the input object electrically couples to the sensor electrode, resulting in a change in the admittance between the sensor electrode and input object. The change in the admittance can be determined from changes in the measured signal.

Turning now to the drawing figures, FIG. 1 is a block diagram of an exemplary electronic system 100 that operates with an input device 116. As will be discussed in greater detail below, the input device 116 can be implemented to function as an interface for the electronic system 100. The input device 116 has a sensing region 118 and is implemented with a processing system 119. Not shown in FIG. 1 is a set of sensing electrodes, including at least one primary sensor electrode and at least one secondary sensor electrode that are electrically coupled to form at least one admittance for sensing objects in the sensing region 118. Also not shown in FIG. 1 is a pressure-sensitive layer configured to change at least one of the admittances in response to pressure applied to a touch surface. In one embodiment, the pressure-sensitive layer is located between the sensor electrodes and the touch surface.

The input device 116 is configured to provide user interface functionality by facilitating user input responsive to objects in the sensing region, proximate to the input device 116. Specifically, the processing system 119 is configured to measure one or more of the admittances, which may be used to determine positional information for input objects in the sensing region 118. This positional information can be used by the system 100 to provide a wide range of user interface functionality.

Additionally, the processing system 119 may be configured to determine pressure information for an input object applying pressure to the touch surface, based upon a change in at least one of the measures of admittance. Furthermore, the processing system 119 may be configured to determine the input object type, such as to distinguish between conductive and nonconductive input objects, based upon the sign (direction) of change in at least one of the measures of admittance. The pressure information and/or object type information may then be used by the processing system 119 or by the electronic system 100 as part of determining the user input being indicated by the input object.

The determined pressure information may be used by the system 100 to provide a wide range of user interface functionality, such as indicating when a user has "pressed" to select a particular item with the input device 116. In other embodiments, the positional and pressure information can be used together to provide user interface functionality. For example, the same pressure applied at different locations may result in different system responses.

Likewise, the determined object type information may be used by the system 100 to enhance the user interface, such as to provide one type of functionality in response to conductive objects, and a different type of functionality in response to nonconductive objects.

In all of these embodiments the pressure-sensitive layer can be implemented with PSEA materials or PSEA layers having a pressure-sensitive admittivity.

Returning to FIG. 1, electronic system 100 is meant to represent any type of stationary or portable computer, including workstations, personal digital assistants (PDAs), video game players, communication devices (e.g., wireless phones and messaging devices), media device recorders and players (e.g., televisions, cable boxes, music players, and video players), digital cameras, video cameras, and other devices capable of accepting input from a user and of processing information. Accordingly, the various embodiments of system 100 may include any type of processing system, memory or display. Additionally, the elements of system 100 may communicate via any combination of protocol and connections, including buses, networks or other wired or wireless interconnections. Non-limiting examples of these include I2C, SPI, PS/2, Universal Serial Bus (USB), Bluetooth®, RF, IRDA.

The input device 116 is sensitive to positional input, such as the position or motion of one or more input objects within the sensing region 118. A stylus 114 is shown in FIG. 1 as an exemplary input object, and other examples include a finger (not shown). "Sensing region" 118 as used herein is intended to broadly encompass any space above, around, in and/or near the input device 116 wherein the sensor is able to detect an input object. In a conventional embodiment, sensing region 118 extends from a surface of the input device 116 in one or more directions into space until the noise and decreased signal prevent accurate object detection. This distance may be on the order of less than a millimeter, millimeters, centimeters, or more, and may vary significantly with the type of position sensing technology used and the accuracy desired. Accordingly, the planarity, size, shape and exact locations of the particular sensing regions 118 can vary widely from embodiment to embodiment.

Sensing regions with rectangular projected shape are common, and many other shapes are possible. For example, depending on the design of the sensor pattern and surrounding circuitry, shielding from any input objects, and the like, sensing regions 118 can be made to have two-dimensional projections of other shapes. Similar approaches can be used to define the three-dimensional shape of the sensing region. For example, any combination of sensor design, shielding, signal manipulation, and the like can effectively define a sensing region in the third dimension (into out of the page) in FIG. 1.

Such sensors, having been configured to sense objects by measuring changes in admittance, can respond to both the proximity of nearby input objects and to the pressure applied by such input objects to the sensing surface. Some such sensors can respond to the simultaneous presence of multiple input objects, (e.g. fingers, pens), and these sensors can provide independent measures of the pressure applied by each of the input objects to the sensing surface.

In one embodiment, the admittance may be an elastive admittance (i.e. the electrical couplings between the primary and secondary sensor electrodes are capacitances or transcapacitances). Such embodiments are particularly useful for detecting input objects in proximity to the sensing surface, in addition to determining pressure information while input objects are in contact with the sensing surface. In these embodiments the input device 116 may determine pressure information by measuring changes in transcapacitance that result from changes in the elastive admittivity of the pressure-sensitive layer that occur in response to pressure applied by an input object. The input device 116 may also determine the input object type, such as whether the input object is conductive or non-conductive, by determining the sign (direction) of change of at least one of the measured transcapacitances.

In another embodiment, the admittances may be conductive admittances, in which case the pressure-sensitive layer primarily changes its conductivity in response to pressure.

The processing system 119 is coupled to the electronic system 100. The processing system 119 can perform a variety of processes on the signals received from the sensor to implement the input device 116. For example, the processing system 119 can select or connect individual sensor electrodes, detect presence/proximity, calculate position or motion information, or interpret object motion as gestures.

In some embodiments, the input device 116 uses processing system 119 to provide electronic indicia of positional information to the electronic system 100. The system 100 appropriately processes the indicia to accept inputs from the user, to move a cursor or other object on a display, or for any other purpose. In such embodiments, processing system 119 can report positional information to electronic system 100 constantly, when a threshold is reached, or in response some criterion such as an identified stroke of object motion. In other embodiments, the processing system 119 directly processes the indicia to accept inputs from the user, to move a cursor or other object on a display, or for any other purpose based on any number and variety of criteria.

In this specification, the term "processing system" includes any number of processing elements appropriate to perform the recited operations. Thus, the processing system 119 can comprise any number of discrete components, any number of integrated circuits, firmware code, and/or software code—whatever is needed to perform the recited operations. In some embodiments, all processing elements that comprise the processing system 119 are located together, in or near the input device 116. In other embodiments, these elements would be physically separated, with some elements of the processing system 119 close to the sensor electrodes, and some elsewhere (such as near other circuitry for the electronic system 100). In this latter embodiment, minimal processing could be performed by the elements near the sensor, and the majority of the processing could be performed by the elements elsewhere.

Furthermore, the processing system 119 can communicate with some part of the electronic system 100, and be physically separate from or physically integrated with that part of the electronic system. For example, the processing system 119 can reside at least partially on a microprocessor for performing functions for the electronic system 100 aside from implementing the input device 116.

As used in this application, the terms "electronic system" and "electronic device" broadly refer to any type of device that operates with input device 116. The electronic system 100 could thus comprise any type of device or devices in which an input device 116 can be implemented in or coupled to. The input device 116 thus could be implemented as part of the electronic system 100, or coupled to the electronic system 100 using any suitable technique. As non-limiting examples, the electronic system 100 could thus comprise any type of computing device listed above or another input device (such as a physical keypad or another touch sensor device). In some cases, the electronic system 100 is itself a peripheral to a larger system. For example, the electronic system 100 could be a data input device such as a remote control, or a data output device such as a display system, that communicates with a computing system using a suitable wired or wireless technique. It should also be noted that the various elements (any processors, memory, etc.) of the electronic system 100 could be implemented as part of the input device 116, as part of a larger system, or as a combination thereof. Additionally, the electronic system 100 could be a host or a slave to the input device 116.

In some embodiments the input device 116 is implemented with buttons 120 or other input devices near the sensing region 118. The buttons 120 can be implemented to provide additional input functionality to the input device 116. For example, the buttons can be used to facilitate selection of items using the proximity sensor device. Of course, this is just one example of how additional input functionality can be added to the input device 116, and in other implementations the input device 116 could include alternate or additional input devices, such as physical or virtual switches, or additional proximity sensing regions. Conversely, the input device 116 can be implemented with no additional input devices.

Likewise, the positional information determined the processing system 119 can be any suitable indicia of object presence. For example, the processing system 119 can be implemented to determine "zero-dimensional" 1-bit positional information (e.g. near/far or contact/no contact) or "one-dimensional" positional information as a scalar (e.g. position or motion along a sensing region). Processing system 119 can also be implemented to determine multi-dimensional positional information as a combination of values (e.g. two-dimensional horizontal/vertical axes, three-dimensional horizontal/vertical/depth axes, angular/radial axes, or any other combination of axes that span multiple dimensions), and the like. Processing system 119 can also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. As will be described in greater detail below, the positional information from the processing system 119 facilitates a full range of interface inputs, including use of the proximity sensor device as a pointing device for cursor control, scrolling, and other functions. Likewise, the term "pressure information" as used herein is intended to broadly refer to any measure of the pressure applied.

In some embodiments, the input device 116 is adapted as part of a touch screen interface. Specifically, the proximity sensor device is combined with a display screen that is overlapped by at least a portion of the sensing region 118. Together the input device 116 and the display screen provide a touch screen for interfacing with the electronic system 100. The display screen can be any type of electronic display capable of displaying a visual interface to a user, and can include any type of LED (including organic LED (OLED)), CRT, LCD, plasma, EL or other display technology. When so implemented, the input device 116 can be used to activate functions on the electronic system 100, such as by allowing a user to select a function by placing an input object in the sensing region proximate an icon or other user interface element that is associated with or otherwise identifies the function. The user's placement of the object can thus identify the function to the electronic system 100. Likewise, the input device 116 can be used to facilitate user interface interactions, such as button functions, scrolling, panning, menu navigation, cursor control, and the like. As another example, the proximity sensor device can be used to facilitate value adjustments, such as by enabling changes to a device parameter. Device parameters can include visual parameters such as color, hue, brightness, and contrast, auditory parameters such as volume, pitch, and intensity, operation parameters such as speed and amplification. In these examples, the proximity sensor device is used to both activate the function and then to perform the adjustment, typically through the use of object motion in the sensing region 118.

It should also be understood that the different parts of the overall device can share physical elements extensively. For example, some display and proximity sensing technologies can utilize the same electrical components for displaying and sensing. As another example, an input device can utilize some of the same electrical components to sense multiple different inputs (e.g. different input devices, or inputs in different locations) or multiple aspects of the same input (e.g. pressure and positional information associated with the same user input)

It should also be understood that while the embodiments of the invention are to be described herein in the context of a fully functioning proximity sensor device, elements of the present invention are capable of being distributed as a program product in a variety of forms. For example, elements of the present invention can be implemented and distributed as a proximity sensor program on computer-readable media. Additionally, the embodiments of the present invention apply equally regardless of the particular type of computer-readable medium used to carry out the distribution. Examples of computer-readable media include: memory sticks/cards/modules and disk drives, which may use flash, optical, magnetic, holographic, or any other storage technology.

Some embodiments of the input device 116 enable pressure sensing for any type of input device, including fingers and styli. Additionally, in some embodiments, the input device 116 enables input both by objects substantially coupled to ground (e.g. fingers or conductive styli held in a human hand) and by objects not substantially coupled to ground (e.g. non-conductive styli or conductive objects insulated from any large ground masses). In these embodiments, input device 116 allows pen-type input with any stylus. In embodiments where fingers and non-conductive styli are both likely to be used, input device 116 also offers the ability to distinguish between these conductive fingers and non-conductive styli. Further, some embodiments enable "full image sensing." With "full image sensing," the input device 116 can generate a two-dimensional image of the user input in the sensing region, instead of projections of the user input along particular axes or other alternatives. In one embodiment the two-dimensional image may be referred to as an "admittance image". "Full image sensing" helps facilitate user input with the simultaneous use of multiple input objects, such as any combination of fingers and styli. All of these benefits can be obtained at very little additional cost over conventional touch sensors.

Pressure-Sensitive Layer

A variety of different PSEA materials and/or constructions with pressure-sensitive admittivity may be used to form the pressure-sensitive layer. For example, some such materials may change their dielectric constant or conductivity in response to applied pressure. Other constructions of the pressure-sensitive layer may be implemented using materials where a change in thickness in response to pressure causes a change in admittivity. As a specific example, a pressure-sensitive layer can be constructed from an elastic material that deforms under pressure and returns to its original shape when the pressure is removed. The elastic material may have a conductive film or other conductive elements disposed on or within it to enhance the change in admittivity. Examples of such elastic materials include compliant foam, various rubbers, and silicone gels. Another method of constructing the pressure-sensitive layer comprises using a flexible material suspended over an air gap. The flexible material may also have a conductive film or other conductive element disposed on it to enhance the change in admittivity. Pressure from an input object deflects the flexible material, reducing the size of the air gap and changing the measured admittance in the manner described above.

For some materials that change their conductivity or elasticity in response to applied pressure, changes in thickness due to such pressure are of secondary consideration to the change in conductivity or elasticity. In fact, many of these materials may be substantially rigid, changing thickness only imperceptibly under pressure. Additionally, some materials are conductive in only one axis (e.g., thickness) when compressed, or otherwise anisotropic in their conductivity or elasticity. As one specific example, a material called Pressure Sensing Membrane, developed by 3M Corporation is conductive in the Z (thickness) axis when compressed. Other materials may conduct equally in all axes (i.e. these materials are isotropically conductive or elastive when compressed).

Furthermore, the pressure-sensitive layer may have a construction that includes one or more different types of materials. For example, the pressure-sensitive layer may comprise a pressure-sensitive material disposed on a surface or disposed between two surfaces. Such configurations may include various segments of pressure-sensitive and non pressure-sensitive materials. Turning now to FIG. 2, several example cross sections of pressure-sensitive layer construction are illustrated.

FIG. 2A illustrates an example where the pressure-sensitive layer 200 comprises a single layer of pressure-sensitive material 210. Such an embodiment could comprise any suitable material having a property such as admittivity that varies in response to pressure.

FIG. 2B illustrates an example where the pressure-sensitive layer 500 comprises a pressure-sensitive material 212 and an insulator 214. In this embodiment, the insulator 214 is located above the pressure-sensitive material 212.

FIG. 2C illustrates a second example where the pressure-sensitive layer 200 comprises a pressure-sensitive material 216 and an insulator 218. In this embodiment the insulator 218 is located below the pressure-sensitive material 216.

FIG. 2D illustrates an example where the pressure-sensitive layer 200 comprises a pressure-sensitive material 220 and two insulators 222 and 224. In this embodiment, the insulators 222 and 224 are disposed on opposite surfaces of the pressure-sensitive material 220.

A variety of different materials can be used for the insulator in FIGS. 2B-2D. For example, the insulator can comprise an adhesive layer used to attach the pressure-sensitive materials to upper or lower elements of the input device, such as substrates comprising other parts of the sensor.

Turning now to FIG. 2E, another embodiment is illustrated where the pressure-sensitive layer 200 comprises a plurality of pressure-sensitive segments 228. In one embodiment, the segments 228 are laid out in a rectilinear array or some other pattern. In one embodiment, each of the segments 228 is disposed over a meeting region (described in more detail later) of primary and secondary sensor electrodes (not shown). In another embodiment, each of the segments 228 is disposed over at least one primary sensor electrode or at least one secondary sensor electrode. In other examples, the segments are disposed in other areas near the primary and secondary sensor electrodes.

Figure 2G:
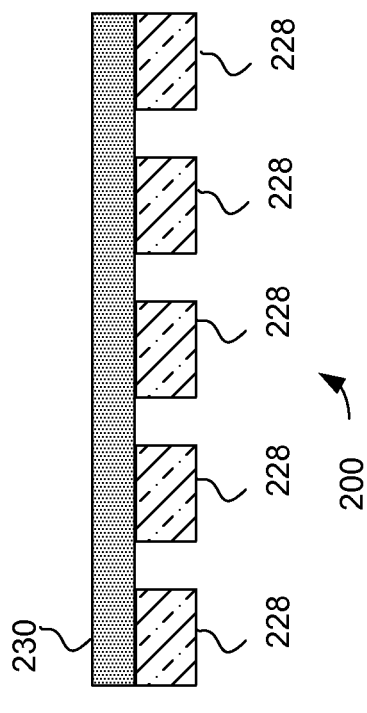
Figure 2H:
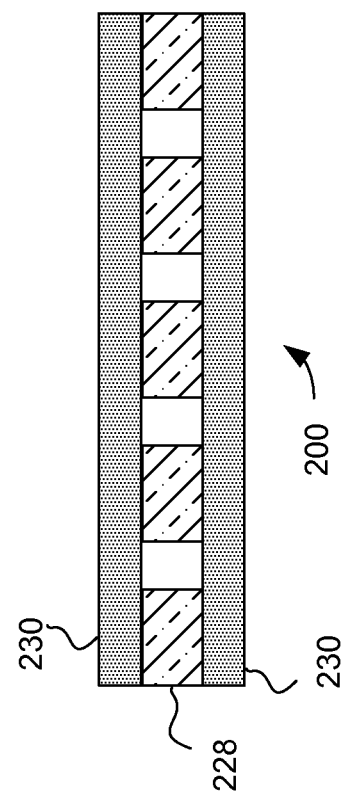

Variations of this embodiment are illustrated in FIGS. 2F, 2G and 2H. In each of these embodiments the pressure-sensitive layer comprises a plurality of pressure-sensitive segments 228 and one or more insulators 230. For example, FIG. 2F illustrates an embodiment where the pressure-sensitive layer 200 comprises an insulator 230 below a plurality of pressure-sensitive segments 228. As another example, FIG. 2G illustrates an embodiment where the pressure-sensitive layer 200 comprises an insulator 230 above a plurality of pressure-sensitive segments 228. As a further example, FIG. 2H illustrates an embodiment where the pressure-sensitive layer 200 comprises insulators 230 both above and below a plurality of pressure-sensitive segments 228. Further, in any of the previous embodiments, insulators 230 may comprise of a plurality of insulator segments, where the insulator segments can be sized to be similar to, smaller than, or larger than the pressure-sensitive segments 228.

Figure 2I:
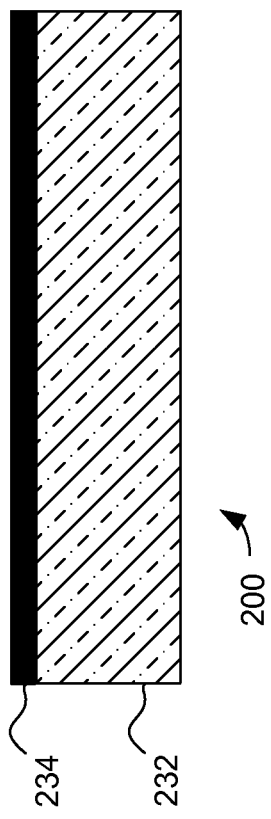
Figure 2J:
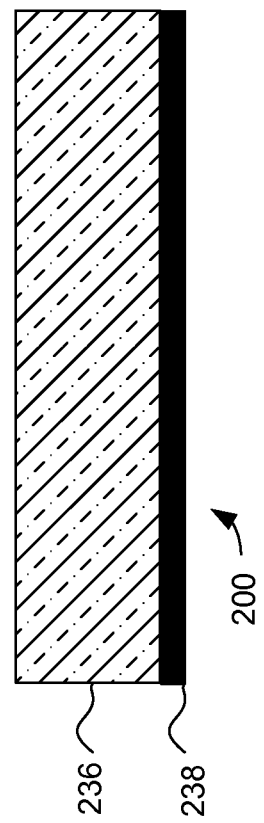

In some embodiments, to enhance performance, conductive elements may be included above, below or within the pressure-sensitive layer. FIG. 2I illustrates an embodiment where pressure-sensitive layer 200 comprises a conductive element 234 located above pressure-sensitive material 232. FIG. 2J illustrates an embodiment where pressure-sensitive layer 200 comprises a conductive element 238 located below the pressure-sensitive material 236. FIG. 2K illustrates an embodiment where pressure-sensitive layer 200 comprises conductive elements 242 disposed within pressure-sensitive material 240. FIG. 2L illustrates an embodiment where pressure-sensitive layer 200 comprises a plurality of conductive elements 252 located above the pressure-sensitive material 250. In another embodiment, the plurality of conductive elements 252 is located below the pressure-sensitive material 250. The conductive elements can enhance changes in admittance when the pressure-sensitive layer changes its admittivity or deforms in response to applied pressure.

Thus, it has been noted that the pressure-sensitive layer can be constructed from a wide variety of materials and with a wide variety of geometries, and it is not intended that the invention be restricted to the examples of pressure-sensitive layers described herein. Rather, any material layer that, when subject to force or pressure, causes a change in the electrical admittance between two nearby sensor electrodes, is encompassed within the scope of the present invention.

Single Node Embodiments

Turning now to FIG. 3, a cross sectional side view of input device 300 is illustrated. Input device 300 includes a substrate layer 302, a primary sensor electrode 304, a secondary sensor electrode 306, a pressure-sensitive layer 308 and a protective layer 310. In the embodiment illustrated in FIG. 3 the primary and secondary sensor electrodes (e.g., electrodes 304 and 306) are formed on the same layer and are separated by a horizontal distance. In contrast, in other embodiments that will be discussed below, the primary and secondary sensor electrodes may be formed on separate layers with an insulator layer between. It should be noted that while all these elements are illustrated in FIG. 3, some of them such as protective layer 310 might not be present in certain embodiments.

The embodiment illustrated in FIG. 3 can be formed in a variety of ways. For example, the primary and secondary sensor electrodes 304 and 306 may be disposed on one face of the substrate layer 302. However, in other embodiments part of the electrodes may be disposed on opposite faces of the substrate layer 302. In yet other embodiments the primary and secondary sensor electrodes 304 and 306 may be disposed on the same face of the substrate in an overlapping fashion, separated by an insulator where they overlap. In one embodiment, the primary and secondary sensor electrodes can be configured to function as a proximity detector or "proximity button" for user input. Note that the construction of FIG. 3 can be extended to incorporate multiple primary sensor electrodes and/or multiple secondary sensor electrodes, enabling input devices such as scrolling strips, sets of multiple proximity buttons, and general object detectors capable of detecting multiple objects and determining position information in multiple dimensions.

In general, primary sensor electrode 304 and secondary sensor electrode 306 are coupled via an electrical admittance. When input objects such as finger 312 are brought proximate to the input device 300 (i.e., within the sensing region of the input device 300) they cause a change in the admittance between the electrodes. This change in admittance can be measured and used to generate positional information for the input objects.

Input objects such as finger 312 may also apply pressure to the input device 300. Specifically, the finger 312 can press against the protective layer 310 of the input device. The pressing of the finger 312 against the protective layer 310 in turn applies pressure (or force) to the pressure-sensitive layer 308. This pressure changes the admittivity of the pressure-sensitive layer 308, causing a further change in the admittance between electrodes 304 and 306. A measure of this further change may used to determine pressure information for the object applying the pressure to protective layer 310.

In one specific implementation, the admittance between the primary sensor electrode 304 and the secondary sensor electrode 306 can be an elastive admittance or a transcapacitance. The direction (sign) of the change (e.g., increase or decrease) in the transcapacitance will depend on the type of object, such as whether the object is conductive or nonconductive. Thus, the sign of the change in transcapacitance may be used to determine if the object applying pressure to the protective layer 310 (or to the pressure-sensitive layer 308 when protective layer 310 is not present) is a conductive object or a nonconductive object. The sign of the change can be used to determine the input object type.

In one embodiment, the pressure-sensitive layer 308 is selected to increase conductivity in response to pressure, and the admittance between primary sensor electrode 304 and secondary sensor electrode 306 is a conductive admittance, or conductance. In such an embodiment the pressure-sensitive layer 308 may have a very low conductivity when no pressure is applied, and thus may be essentially an insulator. As pressure is applied the conductivity increases in regions of the layer near the region of application of the pressure. The rate and range of such a conductivity increase depends upon the materials used in the pressure-sensitive layer 308.

In various embodiments, in order to determine pressure information for input objects, threshold levels may be used. Consider a conductive object touching the protective layer 310, where the conductive object is large enough to completely cover the meeting region of primary sensor electrode 304 and secondary sensor electrode 306. When such a conductive object is not applying sufficient pressure to cause a change in admittivity of the pressure-sensitive layer 308, it results in a threshold level of a change in the magnitude of the measured admittance. Any further change in the magnitude of the measured admittance beyond this threshold level is likely to be a result of a change in admittivity of the pressure-sensitive layer 308, and can therefore be used as a measure of the pressure applied by the conductive object to the protective layer 310.

Conversely, a nonconductive object such as a stylus near the touch surface but not applying significant pressure will not cause a significant change in the magnitude of the measured admittance and thus will typically not be detectable. However, when the nonconductive object applies pressure to the protective layer 310 (and thereby to the pressure-sensitive layer 308), it results in a change in the magnitude of the measured admittance. The amount of the change in the magnitude of the measured admittance is a measure of the pressure applied by the nonconductive object to the protective layer 310. Taken together, a determination of the measure of admittance may be used to determine positional information, pressure information, and/or type information for objects in the sensing region and/or applying pressure to the protective layer 310.

A variety of different materials and techniques can be used to form the primary sensor electrode 304 and the secondary sensor electrode 306. For example, these electrodes can be patterned using a conductive material, such as ITO (indium tin oxide), silver or carbon conductive ink, or copper. Further, any appropriate patterning process may be used, including sputter deposition, printing, and etching.

The protective layer 310 is disposed on the pressure-sensitive layer 308. Typically, the protective layer 310 comprises a flexible material that allows pressure or force to be transmitted to the pressure-sensitive layer 308. In one embodiment, an appliqué is employed as the protective layer 310. In one embodiment, the protective layer 310 comprises a touch surface, and forms a part of the touch sensor that is designed to be touched by users. When used as a touch surface, the protective layer 310 preferably has a pleasing tactile feel or texture. Since such a touch surface is viewable to the users, it also preferably has a pleasing visual texture. The protective layer 310 can be formed of any appropriate material. For example, the protective layer 310 can be implemented using a sheet of textured polyester material, such as that sold under the trade name MYLAR. Where polyester is used, the protective layer 310 can be of any appropriate thickness. In many embodiments, the protective layer includes an adhesive on its underside for affixing it to the top of the pressure-sensitive layer 308 or to a substrate containing the pressure-sensitive layer 308.

The material used to form the protective layer 310 can range from completely opaque to completely transparent. A surface of the protective layer 310 may be painted or otherwise colored to give a uniform appearance. Alternatively or in addition, logos, lettering, graphics, combinations thereof, or other patterns can be applied (e.g. such as via) screen-printing in lieu of a uniform coat of paint. Often, such decorations are embedded or applied on a back side of the protective layer, such that they are protected from wear during use. Other materials suitable for the protective layer 310 include all manner of plastics, including polyethylene terephthalate (PET), polyimide, and polycarbonate (sometimes sold under the trade name LEXAN), combinations thereof, and the like. In an embodiment employing polycarbonate, the sheet thickness of the protective layer is often in a range of about 0.1 mm to about 0.6 mm.

In some embodiments, it may be desirable to insulate the pressure-sensitive layer 308 from the sensor electrodes so that the pressure-sensitive layer does not make ohmic contact with the sensor electrodes. This may be achieved with sufficient separation between the pressure-sensitive layer 308 and the electrodes. Alternatively or in addition, an insulating layer may be disposed between the pressure-sensitive layer 308 and the sensor electrodes. For some transparent embodiments that will be described in greater detail below, the primary sensor electrode 304 and secondary sensor electrode 306 can also be patterned on the underside of a bottom substrate (farther away from the pressure-sensitive layer), or a thin insulating material such as a PET sheet can be placed above the sensor electrodes (i.e., between the sensor electrodes and the pressure-sensitive layer 308). For example, the PET sheet may be placed on top of the primary and secondary sensor electrodes, beneath an air gap and flexible layer.

Turning now to FIG. 4, a cross sectional side view of input device 400 is illustrated. Like that of input device 300, input device 400 includes a substrate layer 402, a primary sensor electrode 404, a secondary sensor electrode 406, a pressure-sensitive layer 408 and a protective layer 410. This embodiment differs from that illustrated in FIG. 3 in that the electrodes 404 and 406 are located between the pressure-sensitive layer 408 and the protective layer 410. This embodiment may operate largely like that described above with reference to FIG. 3; however, in this embodiment, pressure is transmitted through the primary sensor electrode 404 and secondary sensing electrode 406 to the pressure-sensitive layer 408. Thus, the input device can determine positional and pressure information, and in some embodiments can determine the type of object applying pressure.

Figure 5:
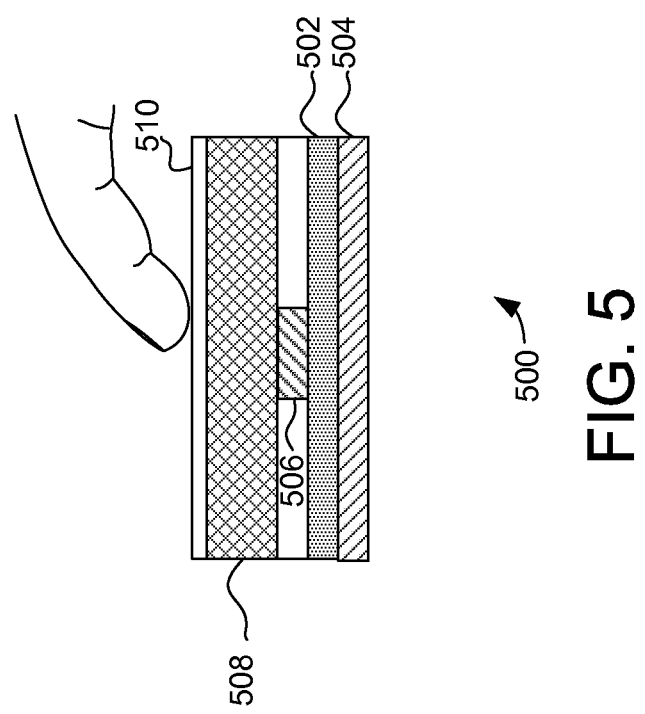

Turning now to FIG. 5, a cross sectional side view of an exemplary input device 500 is illustrated. The input device 500 includes an insulating layer 502, a primary sensor electrode 504 and a secondary sensor electrode 506. This embodiment differs from that illustrated in FIG. 3 in that the primary sensor electrode and the secondary sensor electrode are on different layers, separated by an insulating layer. Finally, a protective layer 510 covers the pressure-sensitive layer 508.

Multi-Node Embodiments

The embodiment illustrated in FIG. 5 is an input device 500 that includes only one primary sensor electrode 504 and one secondary sensor electrode 506. Such an embodiment can determine zero-dimensional positional information, and pressure and type information for one object at a time. Other implementations may include multiple primary and/or multiple secondary sensor electrodes arranged together, enabling the ability to determine such information for multiple input objects simultaneously. Additionally, such devices can typically determine a wider range of positional information, such as the one- and two-dimensional position information described earlier. A variety of these different embodiments will be described below.

Figure 6:
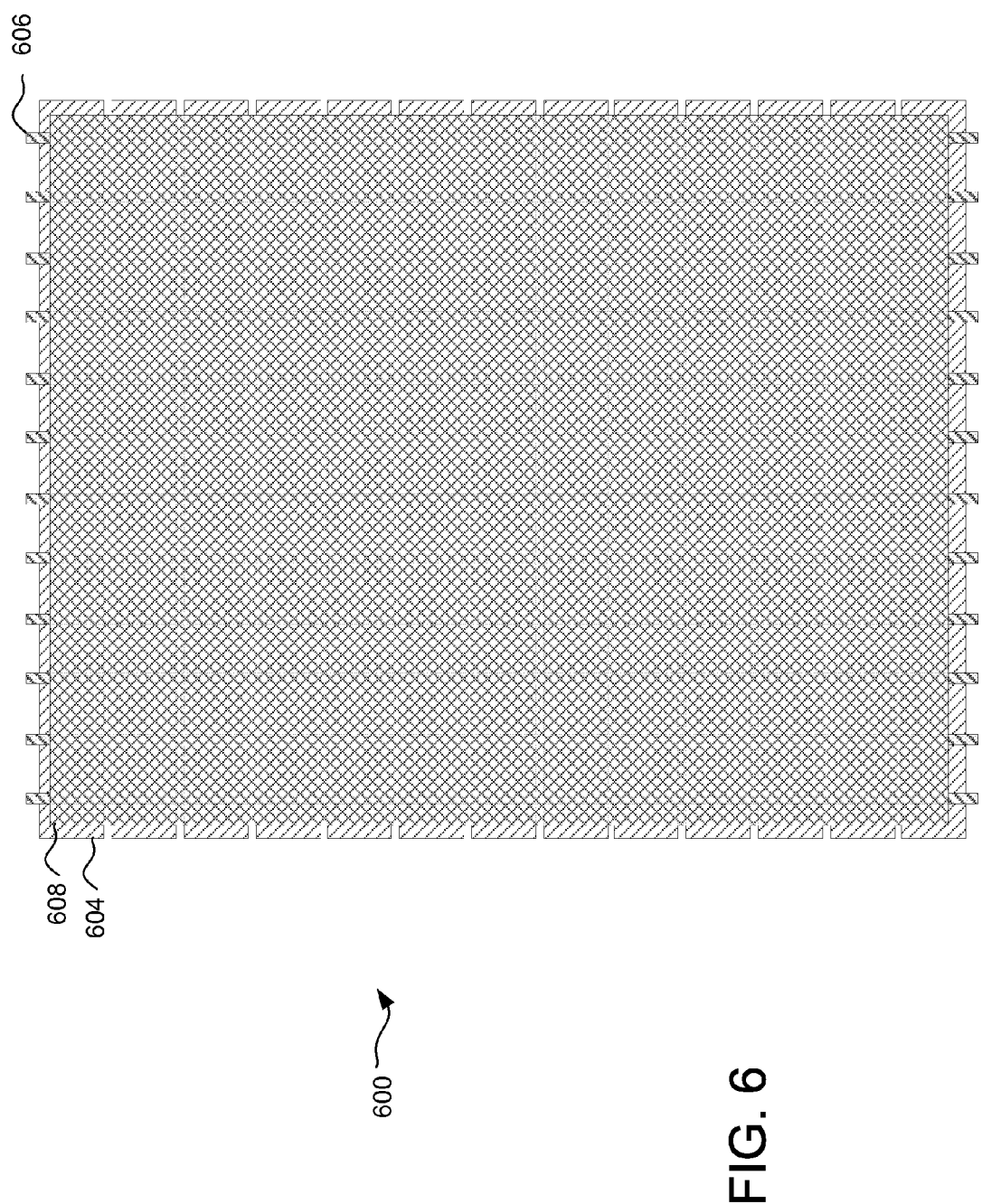

Turning now to FIG. 6, a top view of an exemplary input device 600 is illustrated. In this embodiment, the input device 600 includes a set of primary sensor electrodes 604, a set of secondary sensor electrodes 606, and a pressure-sensitive layer 608 disposed above them. In such embodiments, there are locations where the primary and secondary sensor electrodes are in sufficient physical proximity as to experience substantial electrical coupling. These locations are herein referred to as "meeting regions", and represent the locations where separate admittances can be measured. In this embodiment, the meeting regions are located around each crossing of a primary and a secondary sensor electrode. Each such meeting region can be considered a detection node of the input device 600. In other embodiments, a meeting region is located where a primary sensor electrode and a secondary sensor electrode are physically adjacent to one another. Thus, meeting regions and corresponding detection nodes can be formed in many ways in various embodiments, including interweaving, interdigitating, crossing over, and intertwining at least one primary and at least one secondary sensor electrode.

The input device 600 in FIG. 6 can be seen as an extension of the input device 500 illustrated in FIG. 5, using multiple primary sensor electrodes and multiple secondary sensor electrodes to form multiple meeting regions. As such, the input device 600 may be configured to determine a wider range of positional information, as well as positional and pressure information for multiple objects simultaneously in the sensing region, or for multiple parts of a larger object in the sensing region, such as multiple points on the palm of a hand.

In this illustrated embodiment, the set of primary sensor electrodes 604 is aligned in a first direction, and the set of secondary sensor electrodes 606 is aligned in a second direction. Specifically, the relatively wide, horizontal bars represent the primary sensor electrodes 604. Meanwhile, the narrow, vertical bars (that are partially obscured by the pressure-sensitive layer 608) represent the secondary sensor electrodes 606. Both the primary and secondary sensor electrodes can be fabricated as part of a printed circuit, including flexible or rigid touch sensor circuit boards. As such, the primary and secondary sensor electrodes can be disposed on a substrate assembly that includes one or more substrates, and that forms part or all of an entire circuit assembly. Where the primary and secondary sensor electrodes are disposed on the same substrate, they can be disposed on the same side of the substrate, on opposite sides of the substrate, or both (e.g. where parts of the sensor electrodes are placed on both sides of the substrate). It is understood that many different variations of the embodiment shown in FIG. 6 are viable. For example the pressure-sensitive layer 608 can be segmented into multiple segments.

Figure 7:
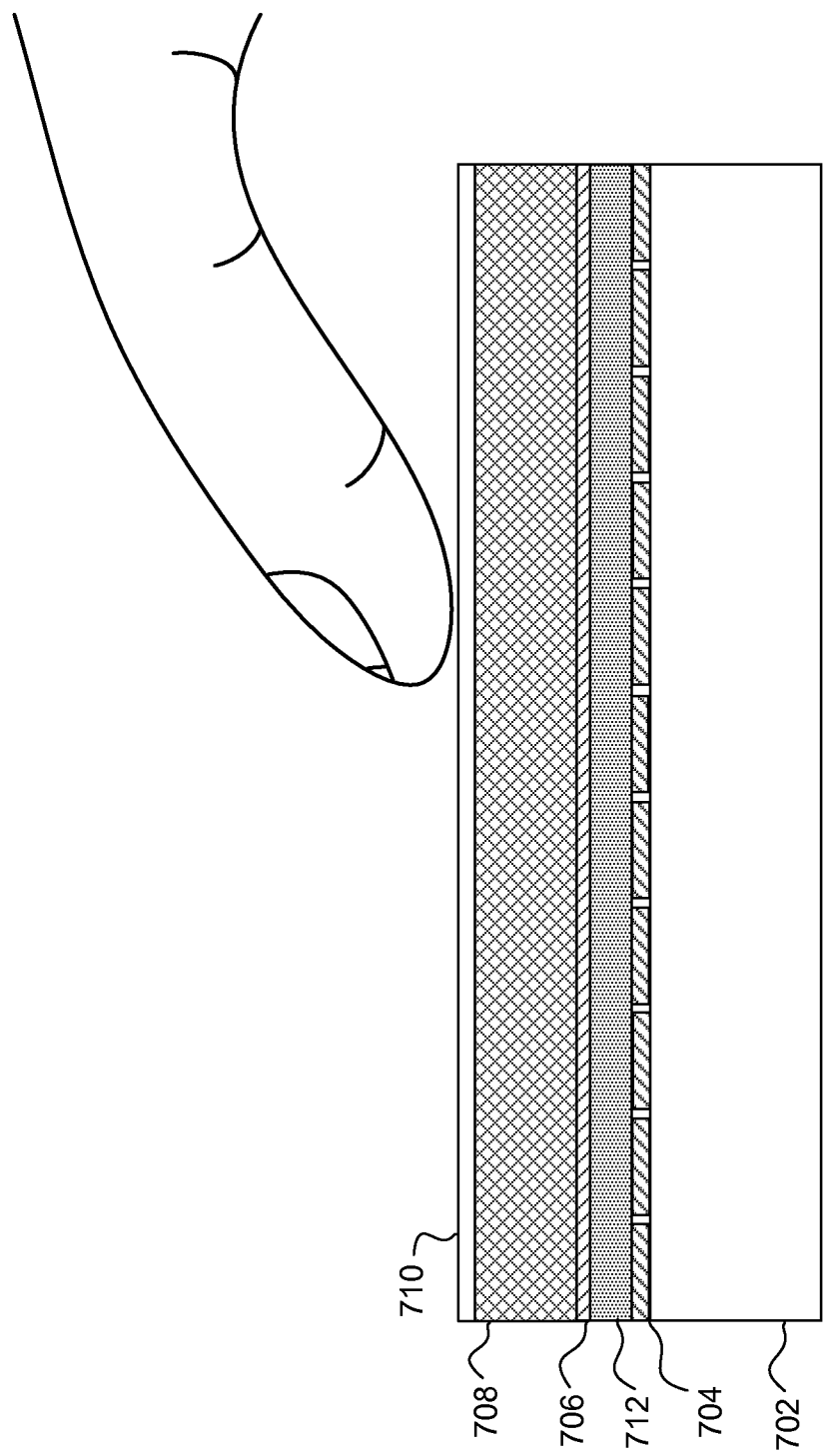

Turning now to FIG. 7, FIG. 7 illustrates a cross-sectional side view of an input device 700 in accordance with a similar embodiment. The input device 700 includes a set of primary sensor electrodes 704, a set of secondary sensor electrodes 706, and a pressure-sensitive layer 708, all formed on a substrate 702. Taken together, the primary sensor electrodes 704 and secondary sensor electrodes 706 may be referred to as the sensor electrodes. An insulating layer 712 is formed between the set of primary sensor electrodes 704 and the set of secondary sensor electrodes 706. In this orientation, the pressure-sensitive layer is located "above" the sensor electrodes. "Above" is used as an orientation, in this case, to denote "closer to where input objects are expected to be during normal operation of the device." Pressure-sensitive layer 708 is configured to overlap at least a portion of at least one of the sensor electrodes.

As shown in FIG. 7, the primary and secondary sensor electrodes are disposed on substrate 702. The substrate 702 can comprise a variety of different arrangements and materials, such as glass or plastic (one common plastic substrate is polyethylene terephthalate, abbreviated as PET). Substrates of other types of materials are also possible. In addition to these types of materials, the substrate 702 may also include multiple layers, such as layers of conductive material or non-conductive material. These other layers may provide electrical shielding, physical protection, fastening ability, and the like. It should also be noted that the substrate 702 may be part of a larger substrate assembly.

Also illustrated in this embodiment is a top protective layer 710 located above the pressure-sensitive layer 708. As described above, a user can press on the protective layer 710, and thereby transmit pressure to the pressure-sensitive layer 708. As was described above and will be described in greater detail below, the resulting change in admittance between primary and secondary sensor electrodes may be used to provide a measure of the pressure applied to the protective layer and/or to determine the type of object applying the pressure.

Furthermore, because a measure of admittance can be determined for each meeting region of the primary sensor electrodes 704 and the secondary sensor electrodes 706, the device 700 facilitates the determination of an array of positional and pressure information. The set of measured admittances for the multiple meeting regions can be represented as a two-dimensional admittance image containing information about all of the objects in the sensing region. By examining this two-dimensional image, "peaks" and "depressions" can be located and interpreted as corresponding to the positions of fingers or other objects. The heights of these peaks and the depths of these depressions can provide independent measures of pressure for each of the input objects, and the lateral extents of these peaks and depressions can be used to determine the sizes or shapes of the objects. Whether the presence of an object results in a peak or a depression depends on the object's electrical properties, such as its conductivity. Thus, the device 700 facilitates the identification of different types of input objects.

The ability to measure input object pressure can help significantly with rejecting unintentional input, as might occur if the input object or finger accidentally brushes lightly across the input device surface. Additionally, the ability to distinguish between conductive objects and non-conductive objects, or between larger objects and smaller objects, offers many advantages. For example, it can be used to distinguish a stylus from a hand when both are present in the sensing region at the same time. In some embodiments of the invention, the hand shows up as a large "depression" in the admittance image, while the stylus shows up as a sharp peak. With many conventional input devices in existence prior to this invention, a hand present in the sensing region will interfere with the reliable detection of a stylus.

In the embodiment illustrated in FIGS. 6 and 7, the primary and secondary sensor electrodes are arranged in rows and columns, respectively. Further, each primary sensor electrode is aligned parallel to the other primary sensor electrodes and each secondary sensor electrode is aligned parallel to the other secondary sensor electrodes. As shown in FIG. 6, the primary sensor electrodes 604 are aligned orthogonally to the secondary sensor electrodes 606; however, the alignment need not be 90 degrees, and can be at any other angle such as 45 degrees, 60 degrees, etc. Furthermore, there is no requirement that the sensor electrodes be straight or parallel to one another. In some embodiments, the primary and secondary sensor electrodes may be arranged so that at least one primary sensor electrode is intertwined with at least one secondary sensor electrode, or so that at least one primary sensor electrode is interweaved with at least one secondary sensor electrode. More detailed examples of these embodiments will be illustrated and discussed below.

In the embodiment illustrated in FIG. 7, an insulating layer 712 is disposed between the primary sensor electrodes 704 and the secondary sensor electrodes 706, each representing separate layers. In another embodiment, at least part of the primary sensor electrodes can be patterned on the same layer as at least part of the secondary sensor electrodes. In such an embodiment, if the primary sensor electrodes and the secondary sensor electrodes need to cross each other, jumpers can be used at the intersections between the primary and secondary sensor electrodes as appropriate, to prevent unwanted electrical contact. Examples of electrode structures with both primary and secondary sensor electrodes formed on the same layer were shown in FIG. 3 and FIG. 4.

It should also be noted that in many of these embodiments the pressure-sensitive layer can be implemented as a single structure that overlaps multiple primary and secondary sensor electrodes. Conversely, such devices can also be implemented with multiple pressure-sensitive layers. In one specific embodiment, the pressure-sensitive layer comprises a plurality of pressure-sensitive segments that are formed over each meeting region (e.g., crossing location) between a primary sensor electrode and a secondary sensor electrode.

Figure 8:
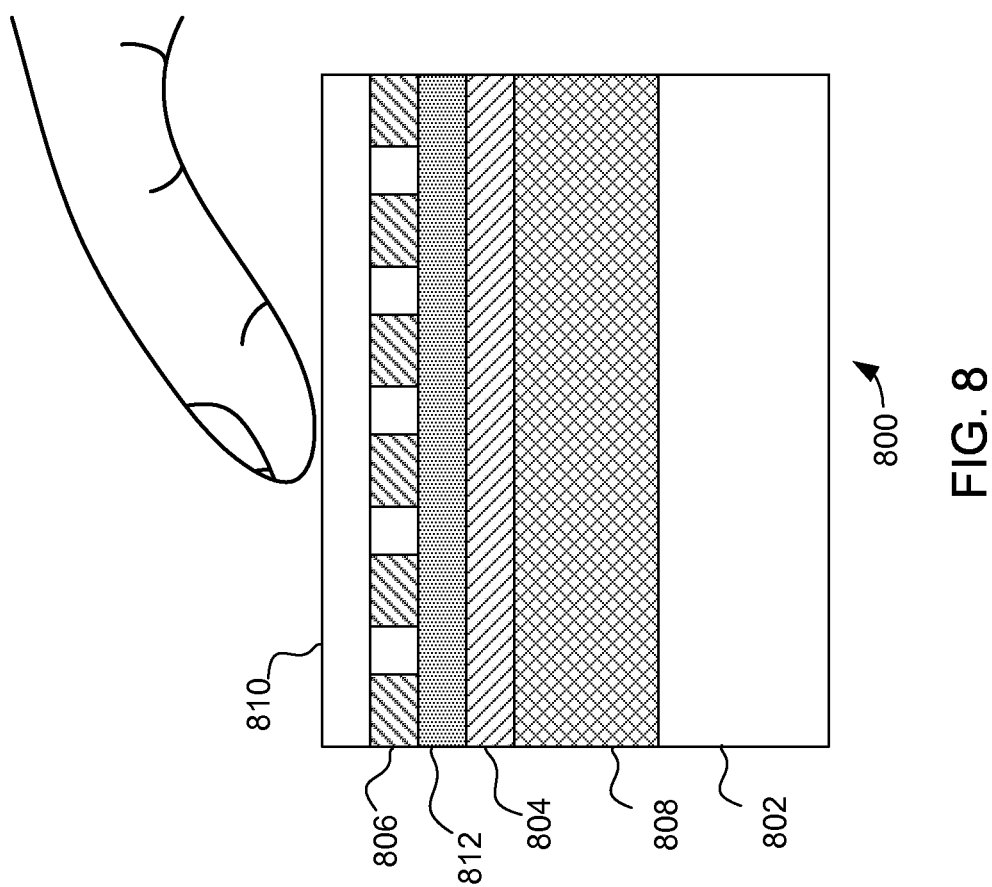

Turning now to FIG. 8, a cross sectional side view of input device 800 is illustrated. Like that of the input device in FIG. 7, this input device 800 includes a substrate layer 802, a set of primary sensor electrodes 804, a set of secondary sensor electrodes 806, a pressure-sensitive layer 808 and a protective layer 810. Again, in this embodiment the primary sensor electrodes 804 and the secondary sensor electrodes 806 are on different layers and are separated by an insulator layer 812. However, this embodiment differs from the embodiment described in FIG. 7 in that the sensor electrodes 804 and 806 are located between the pressure-sensitive layer 808 and the protective layer 810. Again, such an embodiment would largely operate like that described above with reference to FIGS. 6 and 7; however, in this embodiment, pressure is transmitted through the primary sensor electrodes 804 and secondary sensing electrodes 806 to the pressure-sensitive layer 808. Thus, the input device can determine positional and pressure information, and in some embodiments can determine the type of object applying pressure.

Figure 9:
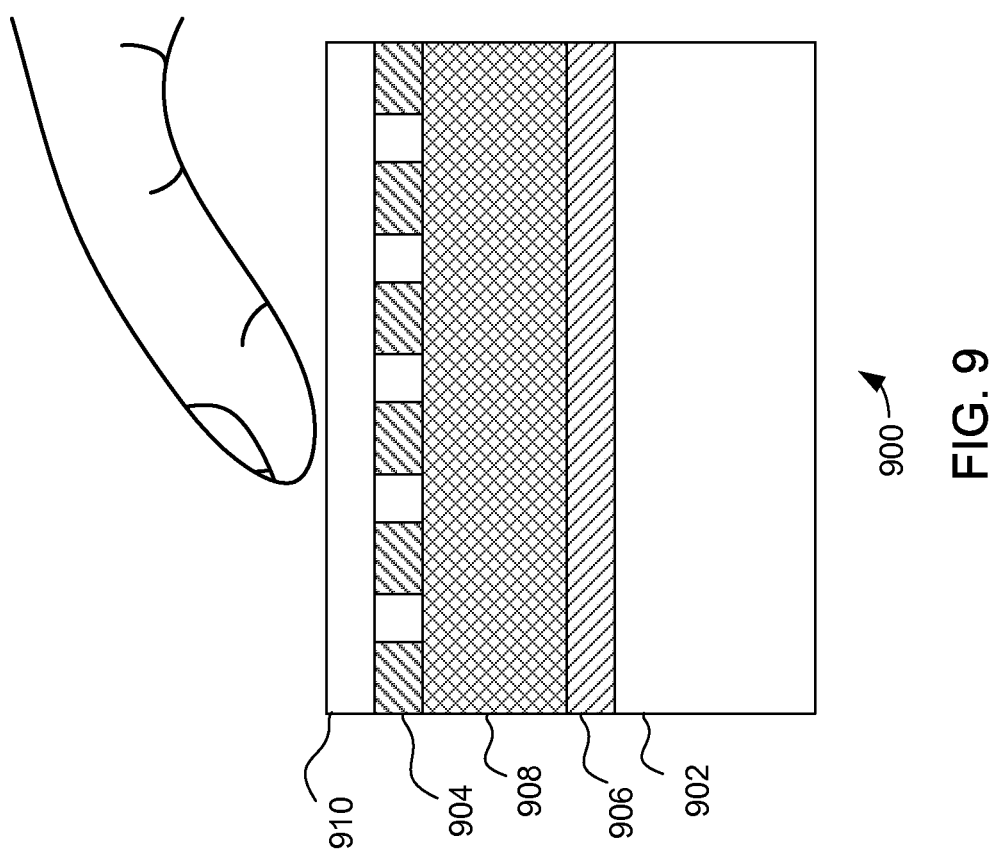

Turning now to FIG. 9, a cross sectional side view of input device 900 is illustrated. Like the previous devices, this input device 900 includes a substrate layer 902, a set of primary sensor electrodes 904, a set of secondary sensor electrodes 906, a pressure-sensitive layer 908 and a protective layer 910. And again, in this embodiment the primary sensor electrodes 904 and the secondary sensor electrodes 906 are on different layers. However, in this embodiment the two sets of sensor electrodes are separated by the pressure-sensitive layer 908. In this example, when an input object is proximate to the sensor, the primary and secondary sensor electrodes can be used to determine positional information for the input object. Further, as the input object applies pressure to the protective layer 910, the pressure will be transmitted to the pressure-sensitive layer, and the admittance between the primary and secondary sensor electrodes will change. Furthermore, such an embodiment can operate generally like that described above with reference to FIGS. 6 and 7. Thus, the input device can determine positional and pressure information, and in some embodiments can determine the type of object applying pressure.

Figure 10:
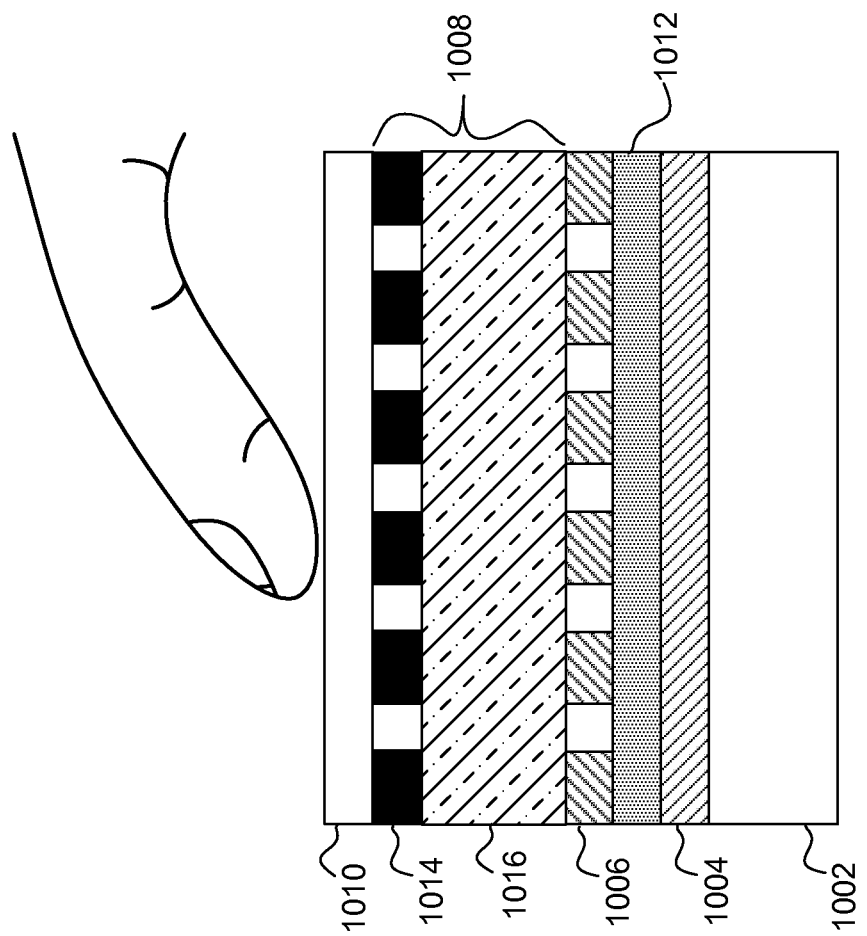

Turning now to FIG. 10, a cross sectional side view of input device 1000 is illustrated. The input device includes a substrate layer 1002, a set of primary sensor electrodes 1004, a set of secondary sensor electrode 1006, pressure-sensitive layer 1008, pressure-sensitive material 1016, a set of electrically floating conductive elements 1014, a protective layer 1010, and insulating layer 1012. As described above, in this embodiment, the primary sensor electrodes 1004 and secondary sensor electrode 1006 are on different layers and located below the pressure sensitive layer 1008. However, in this embodiment a set of electrically floating conductive elements 1014 are positioned above the pressure-sensitive material 1016. In another embodiment, the electrically floating conductive elements 1010 are positioned between the secondary sensor electrodes 1006 and the pressure-sensitive material 1016.

In all the embodiments described herein that incorporate at least one primary sensor electrode and at least one secondary sensor electrode, the designations "primary" and "secondary" are arbitrary. Another equally useful set of embodiments can be obtained by swapping the labels "primary" and "secondary" in each of these embodiments.

Self-Admittance Embodiments

Figure 11:
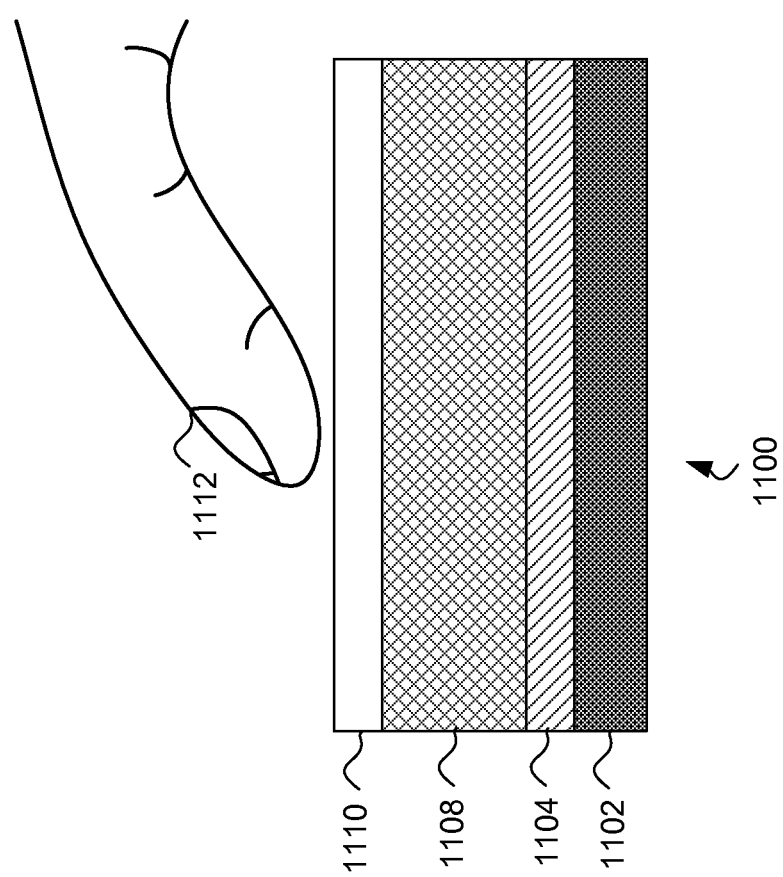

FIG. 11 illustrates a cross-sectional view of an embodiment with a pressure-sensitive layer 1108 disposed over a single sensor electrode 1104. Sensor electrode 1104 is disposed on a surface of substrate 1102. In one embodiment, the sensor electrode 1104 can be configured to function as a proximity button, responding to the presence of an input object such as a user's finger. In another embodiment, multiple sensor electrodes can be configured to function as multiple proximity buttons, or an array of electrodes can be used as a scroll strip to determine one-dimensional positional information. The sensor 1100 can detect the presence of an input object by measuring the change in admittance between the sensor electrode 1104 and the input object 1112. This admittance between the sensor electrode 1104 and the input object 1112 is sometimes known as a "self-admittance".

In one embodiment, to measure a change in the admittance between the sensor electrode the input object, an electrical signal is driven onto the sensor electrode and a property of that signal is measured. For example, a voltage signal can be driven onto the sensor electrode, and the resulting current flow measured. From the measured property (e.g. the measured current flow), a change in the admittance can be determined. As the input object 1112 moves toward the protective layer 1110, the measured self-admittance will change, thus providing a determination of the object's position. Furthermore, as the input object 1112 applies pressure to the protective layer 1110, the pressure-sensitive layer 1108 will change its admittivity, further changing the measured self-admittance and thus providing a determination of the applied pressure.

FIG. 12 is a cross-sectional view of an embodiment with a pressure-sensitive layer 1208 disposed above a set of primary sensor electrodes 1204 and a set of secondary sensor electrodes 1206. During operation, the sensor 1200 is configured to detect positional information and/or pressure information for an input object 1212 by determining changes in the admittances between each of the primary sensor electrodes 1204 and the input object 1212 and between each of the secondary sensor electrodes 1206 and the input object 1212. The admittances for each of the sensor electrodes in FIG. 12 can be determined in the same way as described above for the sensor electrode in FIG. 11, either one-at-a-time, or simultaneously in one or more groups.

In this embodiment, the input object 1212 electrically couples with at least one of the primary and secondary sensor electrodes (1204 and 1206), causing a change in the admittances and thus providing a determination of positional information for the input object. As the input object 1212 applies pressure to the protective layer 1210, the pressure-sensitive layer 1208 will change its admittivity, further changing the admittances and thus providing a determination of the applied pressure.

Furthermore, because a measure of admittance can be determined between an input object 1212 and each of the primary sensor electrodes 1204 and secondary sensor electrodes 1206, the device 1200 facilitates the determination of multi-dimensional position and pressure information. The measured admittances can be represented as two one-dimensional profiles along a first and second axis of the sensor device 1200. These one-dimensional profiles can be thought of as silhouettes or projections of changes in admittance along each axis, and can be used to determine the position and/or pressure of an input object. Each profile can be interpreted as representing the positions of fingers or other objects. The heights of these profiles can provide information related to the pressure applied by each of the input objects, and the lateral extents of these profiles can provide information related to the sizes or shapes of the objects. In some embodiments, while one set of sensor electrodes is being driven with an electrical signal to detect an input object(s) the other set of sensor electrodes may be driven with a guard signal to reduce the impact of parasitic coupling between the two sets of sensor electrodes.

CONCLUSION

Thus, embodiments of the present invention provide devices and methods that facilitate improved input device performance by using a pressure-sensitive layer configured to change one or more electrical admittances in response to pressure applied to a touch surface.

In some embodiments, an input device is provided that comprises a plurality of sensor electrodes including a set of one or more primary sensor electrodes and a set of one or more secondary sensor electrodes. The primary sensor electrodes are electrically coupled to the secondary sensor electrodes to form a set of one or more admittances. In one such embodiment, the pressure-sensitive layer is located between the sensor electrodes and the touch surface.

In other embodiments, an input device is provided that comprises a set of one or more sensor electrodes, which electrically couple to an input object to form a set of one or more admittances. In one such embodiment, the pressure-sensitive layer is located between the sensor electrodes and the touch surface.

What is claimed is:

1. A pressure sensitive input device for sensing an input object in a sensing region, comprising:
   a plurality of sensor electrodes comprising:
      a set of primary sensor electrodes; and
      a set of secondary sensor electrodes, each of the primary sensor electrodes being electrically coupled to and disposed at a fixed distance from at least one of the secondary sensor electrodes to form a set of measurable admittances between each primary sensor electrode and secondary sensor electrode, respectively;
   a touch surface; and
   a pressure-sensitive layer located between the touch surface and both the set of primary sensor electrodes and the set of secondary sensor electrodes, the pressure-sensitive layer configured to change at least one of the measurable admittances, without changing the fixed distance between each primary sensor electrode and each corresponding secondary sensor electrode, in response to pressure applied to the touch surface.

2. The input device of claim 1 further comprising a processing system coupled to the primary sensor electrodes and coupled to the secondary sensor electrodes and configured to determine measures of the admittances, the processing system further configured to determine positional information for the input object in the sensing region based upon the measures of the admittances.

3. The input device of claim 1 further comprising a processing system coupled to the primary sensor electrodes and coupled to the secondary sensor electrodes and configured to determine measures of the admittances, the processing system further configured to determine pressure information for the input object based upon a change in at least one of the measures.

4. The input device of claim 1 further comprising a processing system coupled to the primary sensor electrodes and coupled to the secondary sensor electrodes and configured to determine measures of the admittances, the processing system further configured to distinguish between at least two types of objects based upon a sign of a change in at least one of the measures.

5. The input device of claim 4 wherein the types of objects comprise conductive objects and nonconductive objects, wherein the processing system is further configured to distinguish between a conductive object and a nonconductive object based upon the sign of the change in at least one of the measures.

6. The input device of claim 1 wherein the pressure-sensitive layer comprises an insulating material.

7. The input device of claim 1 wherein the pressure-sensitive layer comprises a plurality of pressure-sensitive segments.

8. The input device of claim 1 wherein the set of admittances comprises a set of conductive admittances.

9. The input device of claim 1 wherein the set of admittances comprises a set of elastive admittances.

10. The input device of claim 1 wherein the pressure-sensitive layer is configured to change the admittances in response to pressure by changing at least one of a dielectric constant and thickness of the pressure-sensitive layer.

11. The input device of claim 1 wherein the set of primary sensor electrodes comprises at least two primary sensor electrodes and the set of secondary sensor electrodes comprises at least two secondary sensor electrodes.

12. A pressure sensitive input device for sensing an input object in a sensing region, comprising:
    a plurality of sensor electrodes comprising:
        a set of primary sensor electrodes;
        a set of secondary sensor electrodes, each of the primary sensor electrodes electrically coupled to and disposed at a fixed distance from at least one of the secondary sensor electrodes to form a set of measurable elastive admittances between each primary sensor electrode and secondary sensor electrode, respectively; and
    a pressure-sensitive layer proximate to at least a portion of the plurality of sensor electrodes, the pressure-sensitive layer located between a touch surface and both the set of primary sensor electrodes and the set of secondary sensor electrodes and configured to change at least one of the measurable elastive admittances, without changing the fixed distance between each primary sensor electrode and each corresponding secondary sensor electrode, in response to pressure applied to the pressure-sensitive layer.

13. The input device of claim 12 further comprising a processing system coupled to the sensor electrodes and configured to determine measures of the elastive admittances, the processing system further configured to determine positional information for the input object in the sensing region based upon the measures of the elastive admittances.

14. The input device of claim 12 further comprising a processing system coupled to the sensor electrodes and configured to determine measures of the elastive admittances, the processing system further configured to determine pressure information for the input object based upon a change in at least one of the measures.

15. The input device of claim 12 further comprising a processing system coupled to the sensor electrodes and configured to determine measures of the elastive admittances, the processing system further configured to distinguish between two types of input objects based upon a sign of a change in at least one of the measures.

16. The input device of claim 15 wherein the two types of objects comprise conductive objects and nonconductive objects, wherein the processing system is further configured to distinguish between a conductive object and a nonconductive object based upon the sign of a change in at least one of the measures.

17. The input device of claim 12 wherein the pressure-sensitive layer comprises a pressure-sensitive material and an insulating material.

18. The input device of claim 12 wherein the pressure-sensitive layer comprises a plurality of pressure-sensitive segments.

19. The input device of claim 12 wherein the pressure-sensitive layer is configured to change at least one of the elastive admittances in response to pressure by changing at least one of a dielectric constant and a thickness of the pressure-sensitive layer.

20. The input device of claim 12 wherein the set of primary sensor electrodes comprises at least two primary sensor electrodes and wherein the set of secondary sensor electrodes comprises at least two secondary sensor electrodes.

21. The input device of claim 12 wherein the pressure-sensitive layer proximate to the at least a portion of the plurality of sensor electrodes comprises the pressure-sensitive layer overlapping at least a portion of the plurality of sensor electrodes.

22. A method for determining user input comprising:
    driving signals onto a set of primary sensor electrodes, wherein the set of primary sensor electrodes is a first part of a plurality of sensor electrodes;
    receiving signals with a set of secondary sensor electrodes, wherein the set of secondary sensor electrodes is a second part of the plurality of sensor electrodes, wherein each of the primary sensor electrodes is electrically coupled to and disposed at a fixed distance from at least one of the secondary sensor electrodes to form a set of measurable admittances, and wherein a pressure-sensitive layer is located between a touch surface and both the set of primary sensor electrodes and the set of secondary sensor electrodes, the pressure-sensitive layer configured to change at least one of the admittances, without changing the fixed distance between each primary sensor electrode and each corresponding secondary sensor electrode, in response to pressure applied to the pressure-sensitive layer by an input object on the touch surface;
    determining measures of the admittances from the signals received;
    determining positional information for the input object on the touch surface from the measures; and
    providing an output representative of the positional information.

23. The method of claim 22 further comprising the steps of:
    determining pressure information for the input object on the touch surface based upon a magnitude of a change in at least one of the measures; and
    providing an output representative of the pressure information.

24. The method of claim 22 further comprising the steps of:
    distinguishing between at least two types of input objects based upon a sign of change in at least one of the measures to determine an object type; and
    providing an output representative of the object type.

25. The method of claim 22 wherein the pressure-sensitive layer is configured to change the measures in response to pressure by changing conductivity in the pressure-sensitive layer.

26. The method of claim 22 wherein the pressure-sensitive layer is configured to change the measures in response to pressure by changing at least one of a dielectric constant and a thickness of the pressure-sensitive layer.

27. A method for determining user input on a device comprising:
    driving signals onto a set of primary sensor electrodes, wherein the set of primary sensor electrodes is a first part of a plurality of sensor electrodes;
    receiving signals with a set of secondary sensor electrodes, wherein the set of secondary sensor electrodes is a second part of the plurality of sensor electrodes, wherein each of the primary sensor electrodes is electrically coupled to and disposed at a fixed distance from at least one of the secondary sensor electrodes to form a set of elastive admittances, and wherein a pressure-sensitive layer is proximate the plurality of sensor electrodes, the pressure-sensitive layer located between a touch surface and both the set of primary sensor electrodes and the set of secondary sensor electrodes configured to change at least one of the elastive admittances, without changing the fixed distance between each primary sensor electrode and each corresponding secondary sensor electrode, in response to pressure applied to the pressure-sensitive layer by an input object;

determining measures of the elastive admittances from the signals received;

determining positional information for the input object in a sensing region from the measures; and providing an output representative of the positional information.

28. The method of claim 27 further comprising the steps of:

determining pressure information for the input object based upon a magnitude of change in at least one of the measures; and providing an output representative of the pressure information.

29. The method of claim 27 further comprising the steps of:

determining an object type for the input object based upon a sign of change in at least one of the measures; and providing an output representative of the object type.

30. The method of claim 27 wherein the pressure-sensitive layer is configured to change at least one of the elastive admittances in response to pressure by changing at least one of a dielectric constant and a thickness of the pressure-sensitive layer.

31. A processing system for use with a pressure sensitive input device, the processing system configured to:

drive signals onto a set of primary sensor electrodes, wherein the set of primary sensor electrodes is a first part of a plurality of sensor electrodes;

receive signals with a set of secondary sensor electrodes, wherein the set of secondary sensor electrodes is a second part of the plurality of sensor electrodes, wherein each of the primary sensor electrodes is electrically coupled to and disposed at a fixed distance from at least one of the secondary sensor electrodes to form a set of admittances, and wherein a pressure-sensitive layer is located between a touch surface and both the set of primary sensor electrodes and the set of secondary sensor electrodes, the pressure-sensitive layer configured to change at least one of the admittances, without changing the fixed distance between each primary sensor electrode and each corresponding secondary sensor electrode, in response to pressure applied to the pressure-sensitive layer by an input object on the touch surface;

determine measures of the admittances from the signals received;

determine positional information for the input object on the touch surface from the measures; and provide an output representative of the positional information.

32. The processing system of claim 31 further configured to:

determine pressure information for the input object on the touch surface based upon a magnitude of a change in at least one of the measures; and provide an output representative of the pressure information.

33. The processing system of claim 31 further configured to:

distinguish between at least two types of input objects based upon a sign of change in at least one of the measures to determine an object type; and provide an output representative of the object type.

34. A processing system for use with a pressure sensitive input device, the processing system configured to:

drive signals onto a set of primary sensor electrodes, wherein the set of primary sensor electrodes is a first part of a plurality of sensor electrodes;

receive signals with a set of secondary sensor electrodes, wherein the set of secondary sensor electrodes is a second part of the plurality of sensor electrodes, wherein each of the primary sensor electrodes is electrically coupled to and disposed at a fixed distance from at least one of the secondary sensor electrodes to form a set of elastive admittances, and wherein a pressure-sensitive layer is proximate the plurality of sensor electrodes, the pressure-sensitive layer located between a touch surface and both the set of primary sensor electrodes and the set of secondary sensor electrodes and configured to change at least one of the elastive admittances, without changing the fixed distance between each primary sensor electrode and each corresponding secondary sensor electrode, in response to pressure applied to the pressure-sensitive layer by an input object;

determine measures of the elastive admittances from the signals received;

determine positional information for the input object in a sensing region from the measures; and provide an output representative of the positional information.

35. The processing system of claim 34 further configured to:

determine pressure information for the input object based upon a magnitude of change in at least one of the measures; and provide an output representative of the pressure information.

36. The processing system of claim 34 further configured to:

determine an object type for the input object based upon a sign of change in at least one of the measures; and provide an output representative of the object type.

37. A pressure sensitive input device for sensing an input object in a sensing region, comprising:

a touch surface;

a primary sensor electrode disposed at a fixed distance from a secondary sensor electrode and forming a variable capacitance therebetween; and a pressure-sensitive layer located between the touch surface and both the primary sensor electrode and the secondary sensor electrode, the pressure-sensitive layer configured to change the variable capacitance, without changing the fixed distance between primary sensor electrode and secondary sensor electrode, in response to pressure applied by the input object to the touch surface.

* * * * *